United States Patent [19]

Nakata et al.

[11] Patent Number: 5,668,456
[45] Date of Patent: Sep. 16, 1997

[54] SERVO MOTOR ENCODER

[75] Inventors: Tomio Nakata; Kenji Shiroshita, both of Iida, Japan

[73] Assignee: Tamagawa Seiki Kabushiki Kaisha, Nagano-Ken, Japan

[21] Appl. No.: 639,113

[22] Filed: Apr. 24, 1996

[51] Int. Cl.⁶ .................................................. G05B 19/29
[52] U.S. Cl. ........................ 318/602; 318/652; 318/647
[58] Field of Search .................................... 318/562, 603, 318/602, 601, 600, 604, 605, 638, 652, 661, 647; 388/800, 801

[56] References Cited

U.S. PATENT DOCUMENTS

| | | | |
|---|---|---|---|
| 4,038,590 | 7/1977 | Knowlton | 318/562 |
| 4,727,300 | 2/1988 | Horikawa et al. | 318/602 |
| 5,215,300 | 6/1993 | Schmidt | 318/602 |

*Primary Examiner*—John W. Cabeca
*Attorney, Agent, or Firm*—Sughrue, Mion, Zinn, Macpeak and Seas

[57] ABSTRACT

The invention provides a servo motor encoder in which signals are output via signal lines and output terminals which are used in common. Incremental signals A, B, and Z and servo motor magnetic pole position detection signals UE, VE, and WE are switched by a multiplexer so as to output these signals via a common line driver. Alternatively, two line drivers are selectively activated and inactivated so that incremental signals and servo motor magnetic pole position detection signals are output via common signal lines. In any modes, signals can be carried via a less number of signal lines.

4 Claims, 3 Drawing Sheets

| P=UE |             | P=A |             |
| Q=VE | T=L-LEVEL   | Q=B | T=H-LEVEL   |
| R=WE |             | R=Z |             |

SERVO MOTOR ENCODER

BACKGROUND OF THE INVENTION

1. Field of the Invention

The present invention relates to a servo motor encoder, and more particularly, to an improved technique of using signal lines and output terminals in common thereby reducing the number of signal lines.

2. Description of the Related Art

FIG. 1 illustrates the structure of a conventional servo motor encoder.

In FIG. 1, reference numeral 1 denotes an incremental signal generator for outputting 3-phase incremental signals A, B, and Z (phases A, B, and Z). The incremental signals A, B, and Z are input to corresponding first drivers 2A, 2B, and 2C. Each first driver 2A, 2B, and 2C is connected to a corresponding pair of output terminals 2A$a$, 2B$a$, and 2C$a$ so that output incremental signals A, $\overline{\text{A}}$, B, $\overline{\text{B}}$, Z, and $\overline{\text{Z}}$ having different phases are output via these output terminals 2A$a$, 2B$a$, and 2C$a$.

Reference numeral 10 denotes a servo motor magnetic pole position detection signal generator for outputting 3-phase servo motor magnetic pole position signals UE, VE, and WE (phases UE, VE, and WE), which are input to corresponding second drivers 11A, 11B, and 11C. Each second driver 11A, 11B, and 11C is connected to a corresponding pair of output terminals 11A$a$, 11B$a$, and 11C$a$ so that output servo motor magnetic pole position detection signals UE, $\overline{\text{UE}}$, VE, $\overline{\text{VE}}$, WE, and $\overline{\text{WE}}$ having different phases are output via the corresponding output terminals 11A$a$, 11B$a$, and 11C$a$.

The output incremental signals A, $\overline{\text{A}}$, ..., Z, $\overline{\text{Z}}$ described above are used for position detection, and the output servo motor magnetic pole position detection signals UE, $\overline{\text{UE}}$, ..., WE, $\overline{\text{WE}}$ are used to switch driving coils of a servo motor (not shown).

The above-described conventional servo motor encoder has problems as described below.

The output incremental signals and the output servo motor magnetic pole position signals are output via the output terminals which are provided for exclusive use by the corresponding signals, and thus a great number of signal lines, twelve lines in this specific example, are required for connections between the output terminals and the encoder. This leads to difficulty in connecting signal lines to the output terminals in an assembling process of an encoder. The great number of signal lines also lead to great complexity in a signal processing circuit at a receiving end.

SUMMARY OF THE INVENTION

It is an object of the present invention to solve the above problems. More specifically, it is an object of the present invention to provide a servo motor encoder, in which signal lines and output terminals are used in common for different signals and thus a less number of signal lines are required.

According to an aspect of the present invention, there is provided a servo motor encoder including an incremental signal generator for generating 3-phase incremental signals A, B, and Z and a servo motor magnetic pole position detection signal generator for generating 3-phase servo motor magnetic pole position detection signals UE, VE, and WE, the encoder being characterized in that the encoder further includes: a multiplexer including three switching elements, the 3-phase incremental signals and 3-phase servo motor magnetic pole position detection signals being input to the multiplexer; a line driver including driver elements corresponding to the switching elements, the driver elements being connected to the multiplexer; pairs of output terminals, each pair of output terminals being connected to the corresponding driver elements; and a timer connected to the multiplexer, the timer being adapted to invert its output when a predetermined time has elapsed after a turning-on operation of the power; wherein the switching elements output the servo motor magnetic pole position detection signals UE, VE, and WE when the output of the timer is at a high (low) level, while the switching elements output the incremental signals A, B, and Z when the output of the timer is at a low (high) level.

According to another aspect of the present invention, there is provided a servo motor encoder including an incremental signal generator for generating 3-phase incremental signals A, B, and Z and a servo motor magnetic pole position detection signal generator for generating 3-phase servo motor magnetic pole position detection signals UE, VE, and WE, the encoder being characterized in that the encoder further includes: a first line driver including three first line driver elements corresponding to the incremental signals A, B and Z; a second line driver including three second line driver elements corresponding to the servo motor magnetic pole position detection signals UE, VE, and WE; pairs of output terminals, each pair of output terminals being connected to the corresponding first driver element; and a timer, the timer being connected to the enable terminal of the first line driver and also to the not-enable terminal of the second line driver; wherein each pair of output lines of each driver element of the second line driver are connected to the corresponding pair of output terminals.

In the servo motor encoder according to the invention, it is determined whether the output terminals output the incremental signals or the servo motor magnetic pole position detection signals, depending on whether the control signal generated by the line driver is at a high level or a low level.

Furthermore, the outputs of the line driver are in a high-impedance state before the incremental signals or the servo motor magnetic pole position detection signals are output from the line driver.

In the servo motor encoder according to the first aspect of the invention, in response to the high or low level of the output of the timer, either the incremental signals or the servo motor magnetic pole position detection signals are selectively input to the line driver via the multiplexer so that the signals are output via the output terminals which are used in common.

In the servo motor according to the second aspect of the invention, the outputs of the first line driver associated with the incremental signals and the outputs of the second line driver associated with the servo motor magnetic pole position detection signals are output via the output terminals which are used in common. In any case, the number of the signal lines and the number of the output terminals are one half those of the conventional encoder.

DESCRIPTION OF THE PREFERRED EMBODIMENTS

Figure 1:
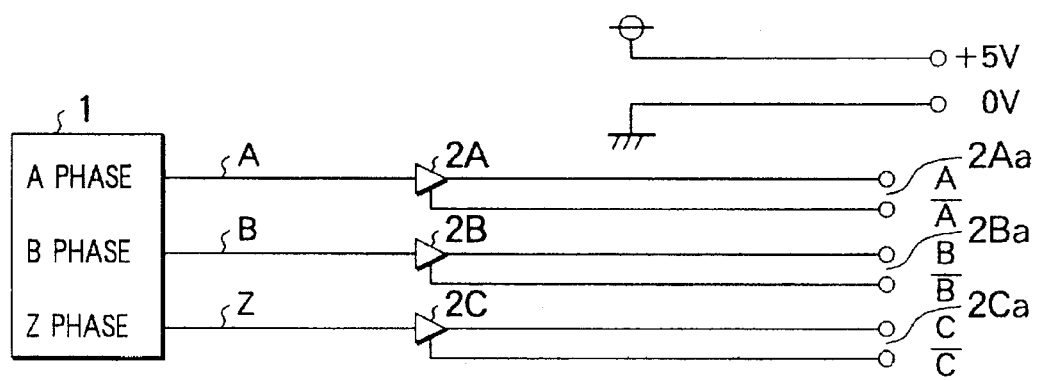
FIG. 1 is a block diagram illustrating a conventional construction.
Figure 1:
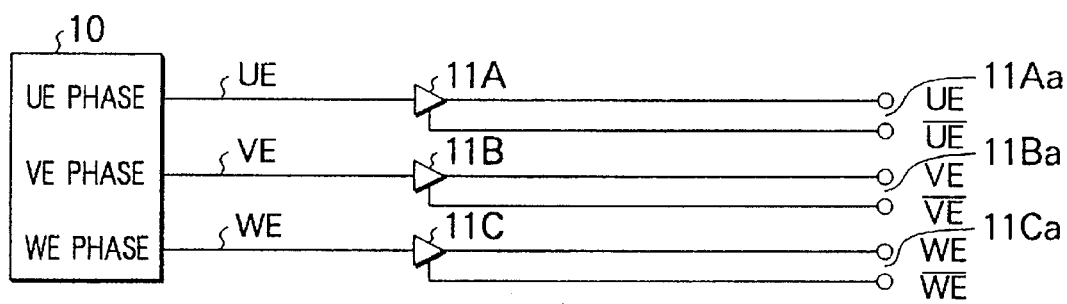

Referring to the accompanying drawings, preferred embodiments of a servo motor encoder according to the present invention will be described below. In the following description, reference numerals similar to those in the above description on the conventional technique are used to denote similar elements.

Figure 2:
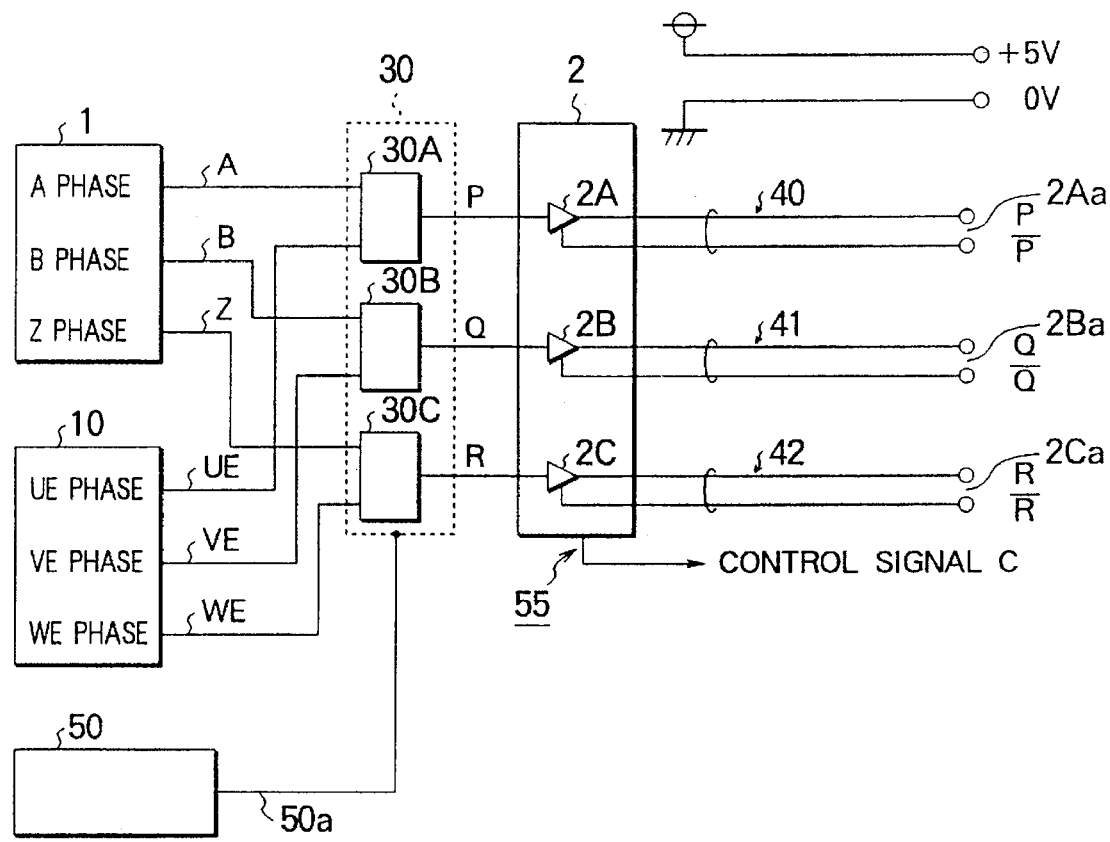
FIG. 2 is a block diagram illustrating a servo motor encoder according to the present invention.
Figure 3:
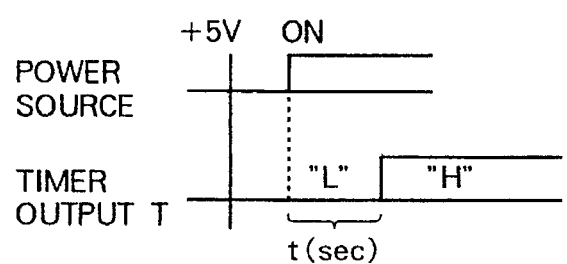
FIG. 3 is a schematic representation of a waveform of a timer signal.

In FIG. 2, reference numeral 1 denotes an incremental signal generator for outputting 3-phase incremental signals A, B, and Z (phases A, B, and Z). These incremental signals A, B, and Z are supplied to a multiplexer 30 having three switching elements 30A, 30B, and 30C in such a manner that each signal is input to a corresponding switching element. Signals P, Q, and R are output from the switching elements 30A, 30B, and 30C, respectively, and supplied to corresponding driver elements 2A, 2B, and 2C of a line driver 2. The line driver 2 has additional one line, and thus has four lines in total. The above additional line outputs a high- or low-level control signal C which is used as an identification signal for distinguishing the servo motor magnetic pole position signals UE, VE, WE from the incremental signals A, B, Z output from terminals 2Aa, 2Ba, 2Ca which will be described later.

Each driver element 2A, 2B, and 2C is connected to a corresponding pair of signal lines 40, 41, and 42. The other ends of each pair of these signal lines are connected to a corresponding pair of output lines 2Aa, 2Ba, and 2Ca. The multiplexer 30 is also connected to a timer 50. The timer 50 has a CR time constant and is designed to invert the timer signal 50a when a predetermined time has elapsed after a turning-on operation of the electric power of the encoder.

The encoder configured in the above-described manner operates as follows. When the electric power of the encoder 55 is turned on, incremental signals A, B, and Z and servo motor magnetic pole position signals UE, VE, and WE generated via a well-known rotary encoding disk are supplied to the respective switching elements 30A, . . . , 30C.

During a time period in which the timer output signal 50a is at a low level after the electric power is turned on, the signals UE, VE, and WE appear at the outputs P, Q, and R, and transmitted to the output terminals 2Aa, 2Ba, and 2Ca via the signal lines 40, 41, and 42, respectively. When the timer output signal 50a is switched to a high level, the switching elements 30A, . . . , 30C perform switching operations so that the signals A, B, and Z appear at the outputs P, Q, and R, respectively. Alternatively, in response to the timer output signal 50a, the signals UE, VE, WE, A, B, and Z may be switched in an opposite manner to that employed in the above example. In the construction shown in FIG. 2, before the signals A, B, Z, UE, VE, and WE are output, the outputs of the line driver 2 are set to a high impedance state. Then, the line driver 2 is reset to a normal state, and the signals A, B, Z, UE, VE, and WE are identified on the basis of the control signal C.

Figure 4:
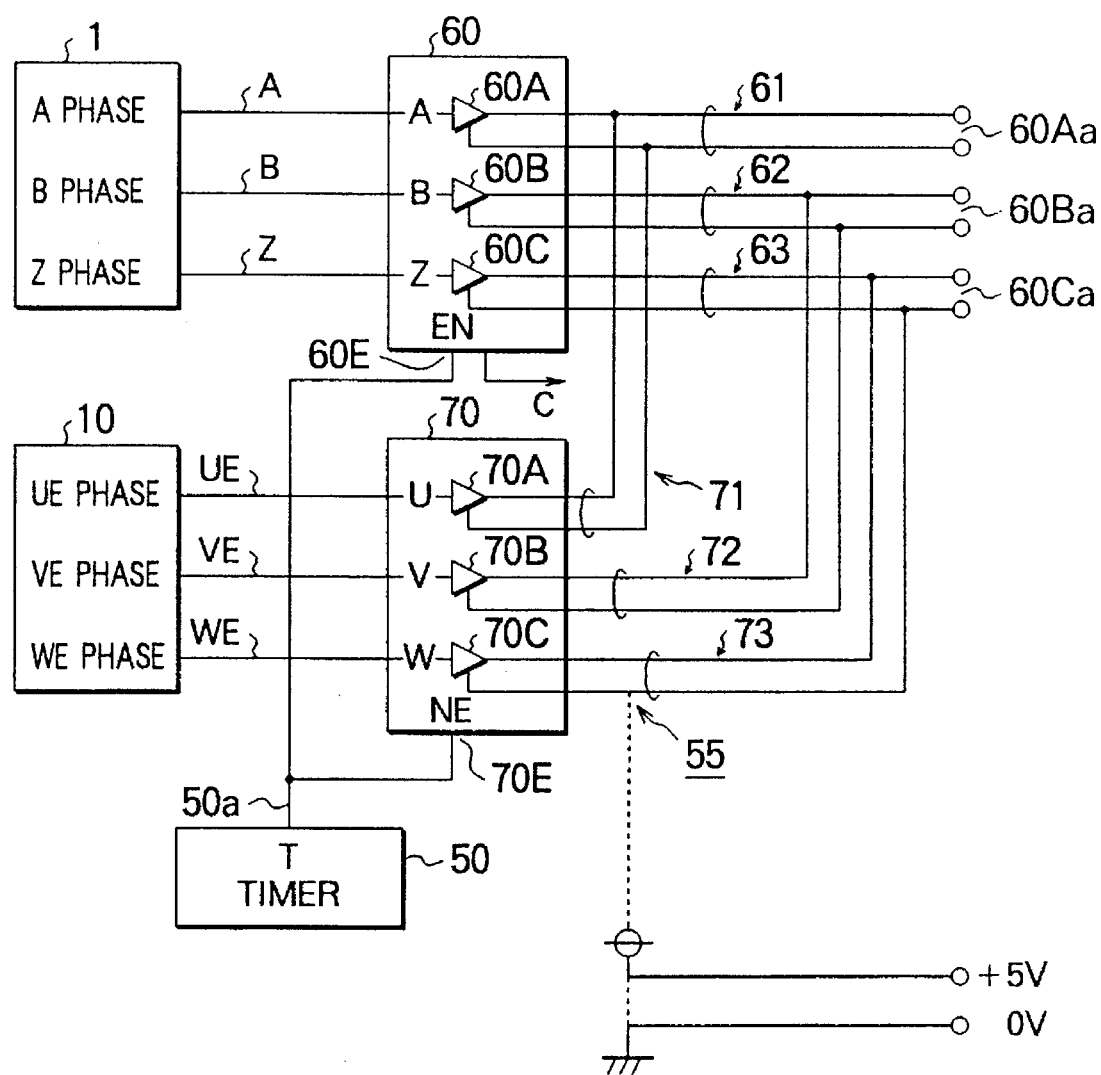
FIG. 4 is a block diagram illustrating a variation of the servo motor encoder shown in FIG. 2.

FIG. 4 illustrates another embodiment of the invention. In this embodiment, incremental signals A, B, and Z are supplied to first driver elements 60A, 60B, and 60C of a first line driver 60. Each first driver element 60A, . . . , 60C is connected to a corresponding pair of output terminals 60Aa, 60Ba, and 60Ca via a corresponding pair of signal lines 61, 62, and 63. When the enable terminal 60E is driven to an on-state by the timer signal 50a output by the timer 50, the incremental signals A, B, and Z appear at the output terminals 60Aa, 60Ba, and 60Ca, respectively.

On the other hand, each servo motor magnetic pole position detection signal UE, VE, and WE is input to corresponding one of three second driver elements 70A, 70B, and 70C of a second line driver 70 provided with a not-enable terminal 70E. Each second driver element 70A, 70B, and 70C is connected to a corresponding pair of signal lines 71, 72, and 73 the other ends of which are connected to corresponding signal lines 61, 62, and 63 so that the servo motor magnetic pole position detection signals UE, VE, and WE are output via the corresponding output terminals 60Aa, 60Ba, and 60Ca. The first and second line drivers 60 and 70 are switched to either an enable state or a not-enable state depending on whether the timer signal 50a applied to the enable terminal 60E and the not-enable terminal 70E is at a high level or a low level. Thus, also in this arrangement as in the construction of FIG. 2, either the incremental signals A, B, and Z (A, $\overline{A}$, B, $\overline{B}$, Z, and $\overline{Z}$) or the servo motor magnetic position detection signals UE, VE, and WE are selectively output via the output terminals 60Aa, 60Ba, and 60Ca. In the construction shown FIG. 4, as in the construction shown in FIG. 2, the control signal C provides a similar function, and the line drivers 60 and 70 are driven to a high-impedance state in a similar manner.

In the present invention, as described above in detail with reference to the specific embodiments, the signal lines and output terminals are used in common to selectively output the incremental signals and the servo motor magnetic pole position detection signals via a multiplexer and a line driver in response to a timer signal, or otherwise via a pair of line drivers in response to a timer signal, thereby achieving a great reduction in the required number of signal lines, from twelve lines as in the conventional technique to six lines.

What is claimed is:

1. A servo motor encoder including an incremental signal generator for generating 3-phase incremental signals A, B, and Z and a servo motor magnetic pole position detection signal generator for generating 3-phase servo motor magnetic pole position detection signals UE, VE, and WE, said encoder being characterized in that said encoder further comprises:

a multiplexer including three switching elements, said 3-phase incremental signals A, B, and Z and 3-phase servo motor magnetic pole position detection signals UE, VE, and WE being input to said multiplexer;

a line driver including driver elements corresponding to said switching elements, said driver elements being connected to said multiplexer;

pairs of output terminals, each said pair of output terminals being connected to the corresponding said driver elements; and a timer connected to said multiplexer, said timer being adapted to invert its output when a predetermined time has elapsed after a turning-on operation of the power;

wherein said switching elements output said servo motor magnetic pole position detection signals when the output of said timer is at a high (low) level, while said switching elements output said incremental signals A, B, and Z when the output of said timer is at a low (high) level.

2. A servo motor encoder including an incremental signal generator for generating 3-phase incremental signals A, B, and Z and a servo motor magnetic pole position detection signal generator for generating 3-phase servo motor magnetic pole position detection signals UE, VE, and WE, said encoder being characterized in that said encoder further comprises:

a first line driver including three first line driver elements corresponding to said incremental signals A, B, and Z;

a second line driver including three second line driver elements corresponding to said servo motor magnetic pole position detection signals UE, VE, and WE;

pairs of output terminals, each said pair of output terminals being connected to the corresponding said first driver elements; and a timer, said timer being connected to the enable a terminal of said first line driver and also to the not-enable terminal of said second line driver;

wherein each pair of output lines of each driver element of said second line driver are connected to the corresponding said pair of output terminals.

3. A servo motor encoder according to claim 1 or 2, wherein it is determined whether the incremental signals or the servo motor magnetic pole position detection signals are output via said output terminals depending on whether the control signal generated by said line driver is at a high level or a low level.

4. A servo motor encoder according to claim 1 or 2, wherein the outputs of said line driver are in a high-impedance state before the incremental signals or the servo motor magnetic pole position detection signals are output from said line driver.

* * * * *